3,631,133
PROCESS FOR EXPANDING POLYSTYRENE
Jean Battigelli, Rantigny, France, assignor to Compagnie de Saint-Gobain, Neuilly-sur-Seine, France
No Drawing. Filed Apr. 13, 1966, Ser. No. 542,236
Claims priority, application France, Apr. 14, 1965, 13,185
Int. Cl. C08f 47/10, 33/02
U.S. Cl. 260—2.5 B  8 Claims

ABSTRACT OF THE DISCLOSURE

Method for expanding granules of polystyrene impregnated with a blowing agent, wherein the granules are successively (a) pre-expanded at about atmospheric pressure by insufflation with steam; (b) conditions by resting in silo at atmospheric pressure for several hours; (c) subjected in an autoclave to steam at about 150 g./cm.² for 30 seconds, the pressure raised to 500 to 700 g./cm.² in about 10 seconds, then reduced to atmospheric in about 10 seconds: (d) cooled slowly in autoclave for about 25 minutes; (e) removed from autoclave and rested in silo for several hours at 40° to 50° C. The method enables polystyrene granules to be expanded from an apparent specific mass of about 650 kg./m.³, to about 4 kg./m.³.

---

The present invention relates to expanded or foamed polystyrene adapted for making articles, such as blocks, slabs and shaped pieces, and particularly to an improved process for expanding the granules of polystyrene preparatory to the manufacture of articles therefrom.

Expanded or foamed polystyrene is generally formed by applying steam to granules of polystyrene containing a blowing agent, such as a low boiling hydrocarbon. The blowing agent is vaporized by the effect of the heat and increases the volume of the granules so that they become expanded or cellular beads. Polystyrene granules and blowing agents for them are well known and need not be described.

In the usual methods of forming articles from expanded polystyrene the expanded beads are agglomerated and shaped by heat and external pressure, for example, by placing the beads in a mold and applying pressure with a movable piston after the granules have been softened sufficiently to become mutually adherent.

It is desirable from the point of view of economy, especially in making heat insulation to use the least material which will produce a given thermal resistance. It is an object of the invention to produce materials with the same or better insulating ability using less polystyrene and regardless of comparative coefficients of thermal conductivity.

For example, if the insulation is formed of a product having a specific mass equal to 12 kg./m.³ and if it is desired to have a heat loss $q$ per surface unit per time unit corresponding to thermal resistance of 1 Kcal./m.²·h·° C., the weight of the insulation would be 420 g. To provide the same thermal resistance with a product having a specific mass equal to 8 kg./m.³, the weight of the insulation would be 320 g. or about 23% less than the weight of insulation in the first case. For the same thermal resistance, with a product having a specific mass equal to 6 kg./m.³, the weight of the insulation would be 275 g. or 34% less than in the first case.

With the known processes of expanding polystyrene containing a blowing agent it is possible to obtain a product which is light in weight and has good insulating properties. In this connection, it will be noted that there is a predetermined proportionate difference between the apparent density of the beads of expanded polystyrene (that is to say, the density of a given volume of the beads which includes the beads and interstices) and the density of the compressed product. The value of this proportion is generally from 0.4 to 0.6 and preferably 0.5. By way of illustration, in order to obtain a product having a specific mass of 8 kg./m.³, a bulk of beads having an apparent specific mass of about 4 kg./m.³ would be used.

One process for obtaining expanded beads of polystyrene having low apparent specific masses for the fabrication of lightweight products consists of treating granules of expansible polystyrene several times with steam and conditioning or curing the polystyrene between applications of steam and after the last one. The conditioning is carried out by passing a moderate flow of slightly warm air over the mass of beads while the mass is together "in silo." Each successive operation increases the apparent specific mass of the beads. Starting with a body of granules of expansible polystyrene having an apparent specific mass of about 650 kg./m.³ and applying four or five successive operations of steam heating and conditioning, beads having an apparent specific mass of 7 kg./m.³ may be produced. But experience has shown that it is difficult to obtain beads having an apparent specific mass less than 7 kg./m.³ by this method.

An object of the present invention is to provide an improved process for producing beads of polystyrene having an apparent specific mass on the order of 5 kg./m.³ (specific gravity of 0.005) or less.

This and other objects of the invention are accomplished generally, in accordance with the process of this invention, by expanding granules of expansible polystyrene at atmospheric pressure by insufflating them with steam, a step which may be called pre-expansion, which produces a partly expanded product, by conditioning the granules in the manner described and by insufflating them with steam in an autoclave under pressure. The expansion of the beads in the second heating step is caused by the vaporization of residual blowing agent which remains in them after the partial expansion produced by the pre-expansion and, perhaps in part, by the evaporation of water which has worked its way into the beads as steam and condensed there during the rest period. When the exterior pressure is released after conditioning and returns to atmospheric, increased expansion follows.

The invention may be practiced by applying a single or a plurality of treatments with steam under pressure in the autoclave, but if several such treatments are applied the beads are rested or conditioned in silo between the treatments. As a final step the beads are preferably given another conditioning by insufflating them with air which is preferably somewhat warmer than room temperature but not of expanding temperature.

The process of this invention makes it possible to provide beads of expanded polystyrene having an apparent specific mass on the order of 4 kg./m.³.

Examples of the practice of the process of this invention are as follows:

EXAMPLE 1

The starting material consisting of granules of polystyrene containing a pentane petroleum fraction as a blowing agent. Its apparent specific mass was 650 kg./m.³. These granules were pre-expanded by heating to 90°–100° C. at atmospheric pressure by insufflating them with steam for 5 to 6 minutes. Then the beads, the partially expanded form of the granules, were conditioned in silo at atmospheric pressure for several hours, for example, 3 hours at 40° C., after which the beads had an apparent specific mass of about 13 kg./m.³. Conditioning of similar effect could also be produced by 24 hours at 20° C. in silo or by 3 hours at 50° C. The beads were placed in an autoclave, steam was admitted under a pressure of 150 g./cm.$^2$ to sweep over the beads for 30 seconds; the pressure was raised to 700 g./cm.$^2$ in 10 seconds; the pressure was reduced in 10 seconds to atmospheric; the beads were cooled slowly in the autoclave for about 25 minutes; the autoclave was opened, the beads were stacked in silo for conditioning and underwent re-expansion during insufflation with air at a temperature of about 50° C. for about 3 hours. The apparent specific mass of the product was approximately 4 kg./m.$^3$.

EXAMPLE 2

Granules of 650 kg./m.$^3$ apparent density were expanded in the air by steam applied for 5–6 minutes. They were conditioned in a silo at atmospheric pressure and 40° C. for 3 hours. The specific mass of the pearls was about 13 kg./m.$^3$. The rested pearls were put in an autoclave and steamed for 30 seconds, the pressure was raised by steam to 500 g./cm.$^2$ in 10 seconds, the pressure was reduced to atmospheric in 10 seconds, and the autoclave was allowed to cool off. The product was transferred to a silo and rested for 3 hours at 40° C. The specific mass of the cellular pearls was about 7 kg./m.$^3$. This product underwent a second treatment in the autoclave and after resting had apparent specific mass of about 4 kg./m.$^3$.

This invention also provides for new, compressed, industrial products, such as blocks, slabs and shaped pieces, of expanded polystyrene which have a density on the order of 10 kg./m.$^3$ and which are made by pressure molding, extruding, or continuously agglomerating beads of polystyrene which have been expanded in accordance wtih the present invention at adequate temperature.

Thanks in particular to the relation between the density of the beads expanded in accordance with the invention and the density of the final product, the products obtained have excellent cohesion and good mechanical properties, such as elasticity and resistance to compression, bending and stamping, despite their low density. The quantity of material required to provide a particular degree of thermal insulation is less with the polystyrene beads expanded in accordance with this invention than with polystyrene expanded by previously used processes.

The expanded polystyrene beads produced in accordance with the present invention also have many useful applications as such. For example, they are particularly well adapted for use as thermal or sound insulation and as a packing material.

As many apparently widely different embodiments of the present invention may be made without departing from the spirit and scope thereof, it is to be understood that the invention is not limited to the specific embodiments.

What is claimed is:

1. The method of producing expanded granules of polystyrene comprising, insufflating polystyrene granules containing a blowing agent, with steam at about atmospheric pressure, to partially expand the granules, conditioning the partially expanded granules at atmospheric pressure, subjecting the partially expanded granules, in a confined space, to steam at about 150 g./cm.$^2$ pressure, and restoring the expanded granules to atmospheric temperature and pressure.

2. The method of producing expanded granules of polystyrene, containing a blowing agent, comprising, pre-expanding the granules with steam, at atmospheric pressure, conditioning the pre-expanded granules for several hours at a temperature of about 40° to 70° C., enclosing the pre-expanded granules in a confined space and heating them for several seconds by steam at about 150 g./cm.$^2$, cooling the expanded granules in the confined space, and conditioning the expanded granules at about 40° to 70° C. at atmospheric pressure.

3. The method according to claim 1 in which the expanded granules are again enclosed in a confined space, and subjected therein to expansion by insufflation with steam at pressure above atmospheric, and cooled and conditioned.

4. The method of claim 1, and raising the pressure of the steam in said confined space to about 500–700 g./cm.$^2$ for a few seconds prior to restoration to atmospheric.

5. The method of claim 4 and after the pressure of the steam in said confined space has been reduced to atmospheric, the expanded granules are cooled within said space, then extracted therefrom and conditioned in silo at about 40° to 70° C.

6. The method of claim 5, and again and similarly subjecting the expanded granules to expansion under pressure.

7. The method of expanding discrete granules of polystyrene, comprising the steps of:
 (1) insufflating the granules with steam at atmospheric pressure for a few minutes to effect their partial expansion,
 (2) aging the partially-expanded granules at atmospheric pressure for several hours and at 40° to 70° C.,
 (3) insufflating the partially-expanded, aged, granules with steam for several seconds in a confined space at about 150 g./cm.$^2$,
 (4) raising the pressure in said space to about 500 to 700 g./cm.$^2$ in a few seconds,
 (5) reducing the pressure in said confined space to atmospheric in a few seconds,
 (6) cooling the expanded granules for several minutes, while in said space, and
 (7) aging the cooled expanded granules for a few hours at about 40° to 70° C.

8. The method of claim 7, the duration of the several steps being about as follows: step (1) 5 to 6 minutes; step (2) 3 to 24 hours; step (3) 30 seconds; step (4) 10 seconds; step (5) 10 seconds; step (6) 25 minutes; step (7) 3 hours.

References Cited

UNITED STATES PATENTS 2,884,386    4/1959    McMillan et al.    260—2.5 B
3,233,016    2/1966    Kracht    260—2.5 B

FOREIGN PATENTS 605,088    9/1960    Canada    260—2.5 B

MURRAY TILLMAN, Primary Examiner

W. J. BRIGGS, SR., Assistant Examiner

U.S. Cl. X.R.

260—93.5 A; 264—53, 55